(12) United States Patent  (10) Patent No.: US 9,940,009 B2
Koga                      (45) Date of Patent:   Apr. 10, 2018

(54) DISPLAY CONTROL DEVICE FOR SCROLLING OF CONTENT BASED ON SENSOR DATA

(71) Applicant: SONY CORPORATION, Tokyo (JP)

(72) Inventor: Yasuyuki Koga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/889,569

(22) PCT Filed: Mar. 18, 2014

(86) PCT No.: PCT/JP2014/057412
§ 371 (c)(1),
(2) Date: Nov. 6, 2015

(87) PCT Pub. No.: WO2014/185146
PCT Pub. Date: Nov. 20, 2014

(65) Prior Publication Data
US 2016/0085403 A1    Mar. 24, 2016

(30) Foreign Application Priority Data
May 15, 2013  (JP) ................. 2013-102885

(51) Int. Cl.
*G06F 3/0485* (2013.01)
*G06T 3/20* (2006.01)
(Continued)

(52) U.S. Cl.
CPC ....... *G06F 3/0485* (2013.01); *G02B 27/0093* (2013.01); *G02B 27/017* (2013.01);
(Continued)

(58) Field of Classification Search
CPC ......... G06T 19/006; G06T 19/00; G06T 3/20; G06F 3/0484; G06F 3/0485;
(Continued)

(56) References Cited

U.S. PATENT DOCUMENTS 6,624,824 B1 *  9/2003  Tognazzini ........... G06F 1/1626
                                                345/169
2006/0284792 A1   12/2006  Foxlin
(Continued)

FOREIGN PATENT DOCUMENTS

EP    2293176 A2    3/2011
EP    2485119 A2    8/2012
(Continued)

OTHER PUBLICATIONS

Extended European Search Report of EP Patent Application No. 14797308.5, dated Jan. 3, 2017, 8 pages.
(Continued)

*Primary Examiner* — Chante Harrison
(74) *Attorney, Agent, or Firm* — Chip Law Group

(57) ABSTRACT

[Object] To provide a technique for allowing a user to easily scroll content.
[Solution] There is provided a display control device including a first acquiring unit configured to acquire orientation of a display unit detected by a first detecting unit, and a display control unit configured to display content at the display unit. The display control unit scrolls the content according to the orientation of the display unit.

10 Claims, 18 Drawing Sheets

(51) Int. Cl.
  *G02B 27/01* (2006.01)
  *G06F 3/0346* (2013.01)
  *G06F 3/01* (2006.01)
  *G02B 27/00* (2006.01)
  *G06F 3/0484* (2013.01)
  *G06F 3/0487* (2013.01)
  *G06F 3/0488* (2013.01)
  *A63F 13/211* (2014.01)

(52) U.S. Cl.
  CPC ............ *G06F 3/014* (2013.01); *G06F 3/0487* (2013.01); *G06F 3/0488* (2013.01); *G06F 3/04842* (2013.01); *A63F 13/211* (2014.09); *G02B 2027/014* (2013.01); *G02B 2027/0187* (2013.01)

(58) Field of Classification Search
  CPC ..... G06F 3/04845; G06F 3/0346; G09G 4/32; G96F 2200/1637; G02B 2027/0125; G02B 2027/0163; G02B 2027/0178; G02B 27/0093; G02B 27/01; G02B 27/017; G02B 27/0179
  USPC ....... 345/632–634, 156, 158, 7, 8, 684, 619, 345/649–650, 672, 678, 680
  See application file for complete search history.

(56) References Cited

U.S. PATENT DOCUMENTS

| | | | |
|---|---|---|---|
| 2010/0079356 A1* | 4/2010 | Hoellwarth | G02B 27/017 345/8 |
| 2010/0079494 A1* | 4/2010 | Sung | G06F 1/1626 345/650 |
| 2012/0017147 A1* | 1/2012 | Mark | G06F 1/1639 345/158 |
| 2012/0064951 A1 | 3/2012 | Agevik et al. | |
| 2012/0068914 A1 | 3/2012 | Jacobsen et al. | |
| 2012/0169940 A1* | 7/2012 | Eom | H04N 21/4858 348/734 |
| 2012/0188148 A1 | 7/2012 | Dejong | |
| 2013/0044042 A1* | 2/2013 | Olsson | G02B 27/0176 345/8 |
| 2014/0198035 A1* | 7/2014 | Bailey | G06F 3/014 345/156 |
| 2014/0372915 A1* | 12/2014 | Kung | G06F 3/0488 715/761 |
| 2015/0185836 A1* | 7/2015 | Slonneger | G06F 3/014 345/156 |
| 2015/0206350 A1* | 7/2015 | Gardes | H04N 5/265 345/619 |
| 2015/0366479 A1* | 12/2015 | Kim | A61B 5/1126 345/156 |
| 2016/0011420 A1* | 1/2016 | Jang | G02B 27/0172 345/8 |
| 2016/0054802 A1* | 2/2016 | Dickerson | G06F 3/017 345/158 |
| 2016/0103483 A1* | 4/2016 | Raffle | G06F 3/011 345/156 |
| 2016/0139787 A1* | 5/2016 | Joo | G02B 27/017 715/765 |
| 2016/0335981 A1* | 11/2016 | Koo | G09G 5/003 |
| 2017/0060230 A1* | 3/2017 | Faaborg | G06F 3/011 |
| 2017/0224140 A1* | 8/2017 | Vertegaal | A47G 19/2227 |

FOREIGN PATENT DOCUMENTS

| | | |
|---|---|---|
| JP | 07095498 A | 4/1995 |
| JP | 2011059781 A | 3/2001 |
| JP | 2011082781 A | 4/2001 |
| JP | 2003280785 A | 10/2003 |
| JP | 2009-021914 A | 1/2009 |
| JP | 2009021914 A | 1/2009 |
| JP | 2010-515876 A | 5/2010 |
| JP | 2011-082781 A | 4/2011 |
| JP | 2012161804 A | 8/2012 |
| JP | 2012-252568 A | 12/2012 |
| JP | 2013-012024 A | 1/2013 |
| JP | 2013012024 A | 1/2013 |

OTHER PUBLICATIONS

Office Action for JP Patent Application No. 2015-516976, dated Sep. 26, 2017, 4 pages of Office Action and 3 pages of English Translation.

Office Action for JP Patent Application No. 2015-516976, dated Dec. 5, 2017, 3 pages of Office Action and 2 pages of English Translation.

* cited by examiner

DISPLAY CONTROL DEVICE FOR SCROLLING OF CONTENT BASED ON SENSOR DATA

CROSS REFERENCE TO RELATED APPLICATIONS

This application claims the benefit of Japanese Priority Patent Application JP 2013-102885 filed May 15, 2013, the entire contents of which are incorporated herein by reference.

Technical Field

The present disclosure relates to a display control device, a display control method, and a recording medium.

Background Art

In recent years, a head mounted display (HMD) as a display to be mounted on the head of a user has been developed. While it is assumed that fixed content is displayed at the HMD mounted on the head of the user regardless of orientation of the head of the user, it is also assumed that content may be changed based on orientation of the head of the user. For example, a technique of specifying content to be displayed at the HMD based on the orientation of the head of the user is disclosed (see, for example, Patent Literature 1).

CITATION LIST

Patent Literature

Patent Literature 1: JP 2013-12024A

SUMMARY OF INVENTION

Technical Problem

However, it is desirable to realize a technique for allowing a user to easily scroll content.

Solution to Problem

According to the present disclosure, there is provided a display control device including: a first acquiring unit configured to acquire orientation of a display unit detected by a first detecting unit; and a display control unit configured to display content at the display unit. The display control unit scrolls the content according to the orientation of the display unit.

Further, according to the present disclosure, there is provided a display control method including: acquiring orientation of a display unit detected by a first detecting unit; displaying content at the display unit; and scrolling the content according to the orientation of the display unit.

There is provided a computer-readable recording medium having a program recorded therein, the program causing a computer to function as a display control device including: a first acquiring unit configured to acquire orientation of a display unit detected by a first detecting unit; and a display control unit configured to display content at the display unit. The display control unit scrolls the content according to the orientation of the display unit.

Advantageous Effects of Invention

As described above, according to the present disclosure, it is possible to provide a technique for allowing a user to easily scroll content.

DESCRIPTION OF EMBODIMENTS

Figure 1:
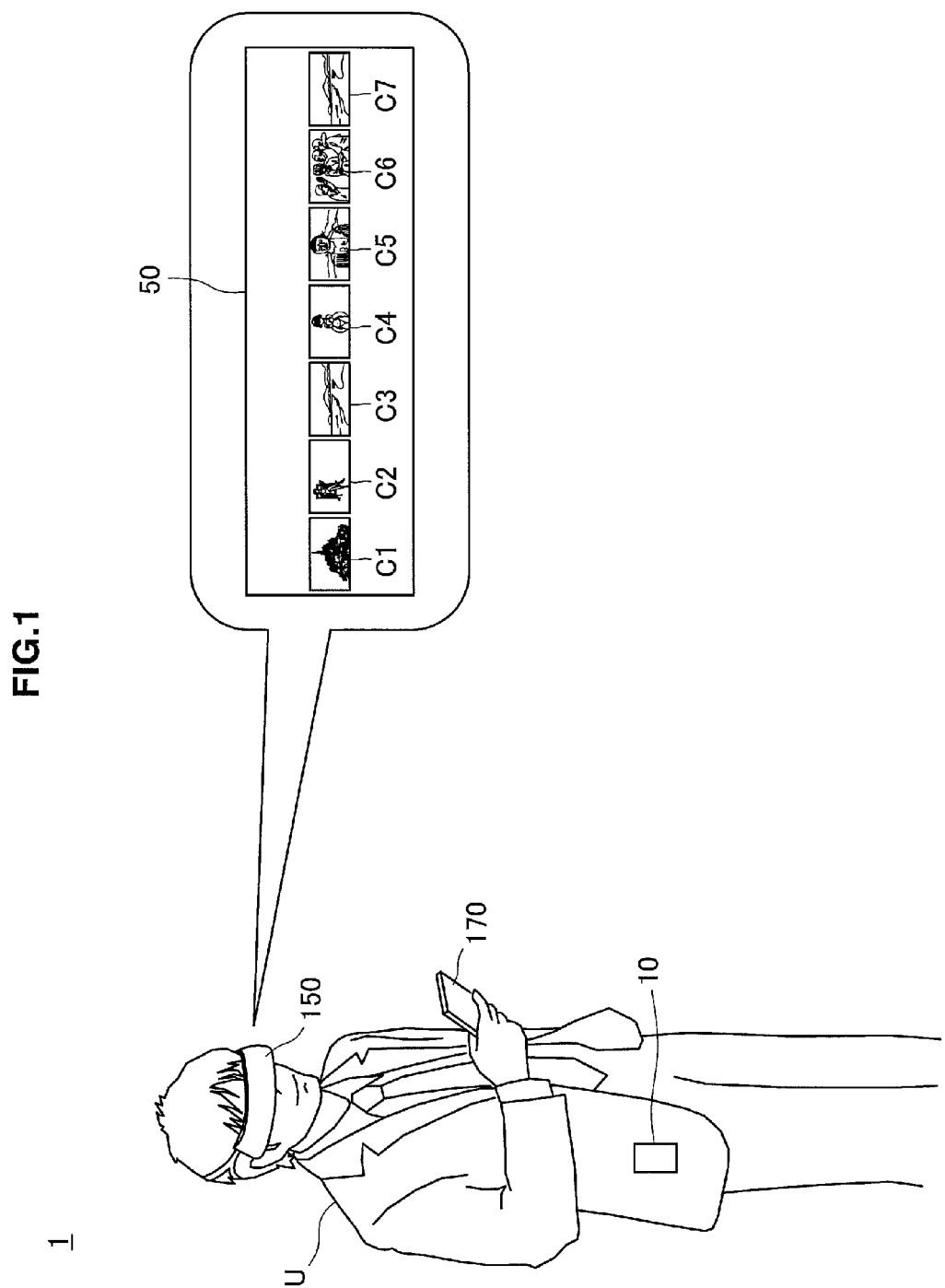
FIG. 1 is a diagram illustrating outline of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, structural elements that have substantially the same function and structure are in some cases differentiated by denoting with different alphabet letters provided after the same reference numeral. However, in cases where it is not necessary to distinguish among a plurality of structural elements having substantially the same function and structure, such structural elements are denoted using just the same reference numeral.

Further, the "Description of Embodiment" will be described along the following items:
1. Embodiment
1-1. Outline of information processing system
1-2. Configuration example of functions of information processing system
1-3. Details of functions of information processing system
1-4. Hardware configuration example
2. Conclusion <<1. Embodiment>>

An embodiment of the present disclosure will be described first.

[1-1. Outline of Information Processing System]

First, a configuration example of an information processing system 1 according to the embodiment of the present disclosure will be described. FIG. 1 is a diagram illustrating outline of the information processing system 1 according to the embodiment of the present disclosure. As illustrated in FIG. 1, the information processing system 1 includes a display control device 10, a display unit 150, and a terminal 170.

The display unit 150 has a function of displaying a screen 50 according to a control signal provided in a wireless or wired manner from the display control device 10. Types of the screen 50 displayed at the display unit 150 are not particularly limited. As illustrated in FIG. 1, a case is mainly assumed where the display unit 150 is a head mount display (HMD) to be mounted on the head of a user U. Types of the HMD are not particularly limited, and the HMD may be a transmission type HMD or a non-transmission type HMD.

The terminal 170 is a terminal used by the user U. Types of the terminal 170 are not particularly limited, and the terminal 170 may be a video camera, a smartphone or a personal digital assistants (PDA). Alternatively, the terminal 170 may be a personal computer (PC), a mobile phone, a mobile music reproduction device, a mobile image processing device, or mobile game equipment.

The display control device 10 has a function of displaying the screen 50 at the display unit 150. The screen 50 may include content C1 to C7 as illustrated in FIG. 1 or may include objects as will be described later. The number of pieces of content is not particularly limited. Further, types of content are not particularly limited, and, as illustrated in FIG. 1, the content may be an image (such as, for example, a still image and a moving image) or may be text data. Note that while the display control device 10 is configured separately from the display unit 150 in the example illustrated in FIG. 1, the display control device 10 may be integrated with the display unit 150.

In the present specification, a technique for allowing the user U to easily scroll the content to be displayed at the display unit 150 in this manner will be mainly described.

The outline of the information processing system 1 according to the embodiment of the present disclosure has been described above.

[1-2. Configuration Example of Functions of Information Processing System]

Figure 2:
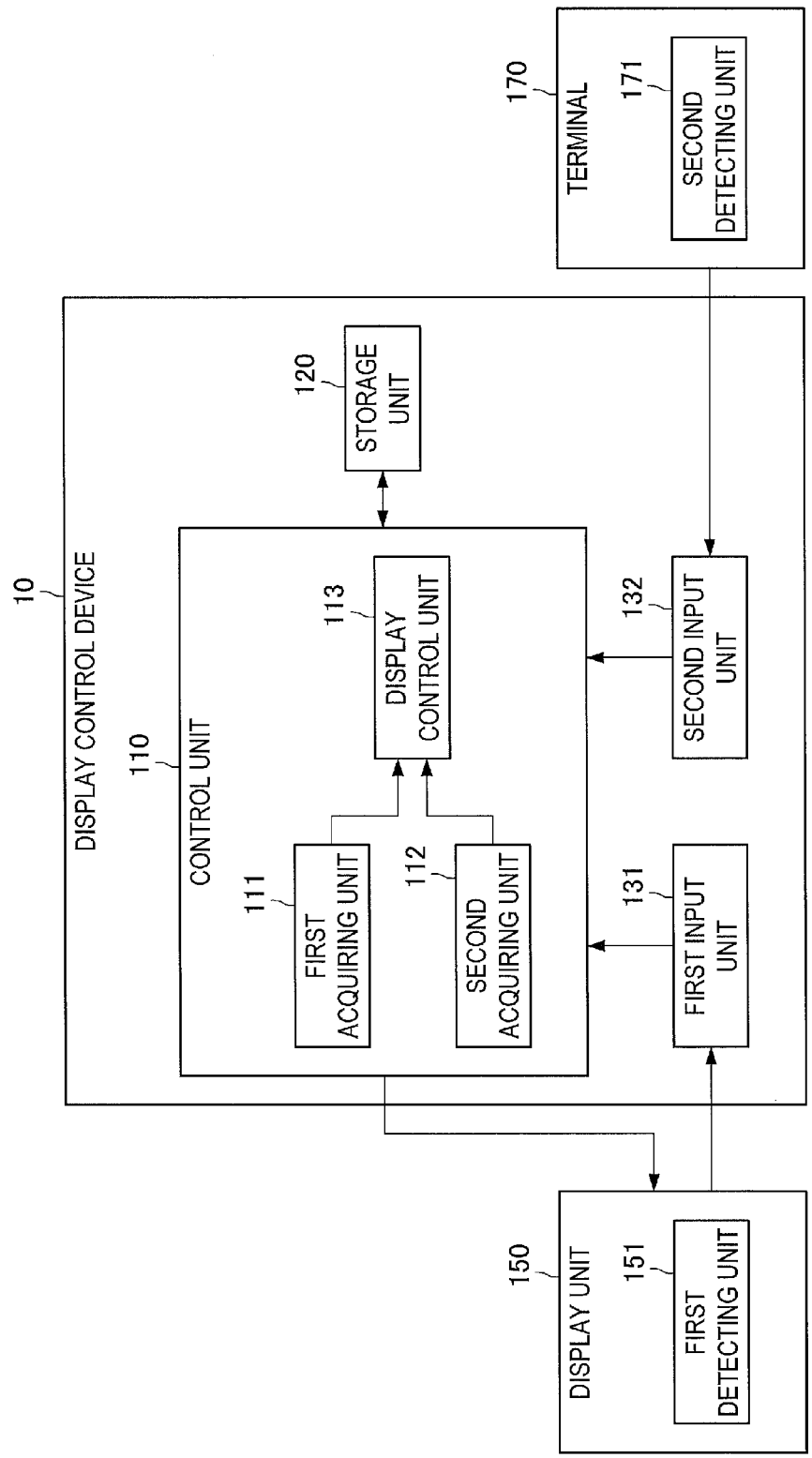
FIG. 2 is a diagram illustrating a configuration example of functions of the information processing system according to the embodiment of the present disclosure.

A configuration example of functions of the information processing system 1 according to the embodiment of the present disclosure will be described next. FIG. 2 is a diagram illustrating the configuration example of the functions of the information processing system 1 according to the embodiment of the present disclosure. As illustrated in FIG. 2, the display control device 10 according to the embodiment of the present disclosure includes a control unit 110, a storage unit 120, a first input unit 131 and a second input unit 132.

The control unit 110 corresponds to, for example a processor such as a central processing unit (CPU). The control unit 110 fulfills various functions of the control unit 110 by executing a program stored in the storage unit 120 or other storage media. The control unit 110 includes a first acquiring unit 111, a second acquiring unit 112 and a display control unit 113. Functions of these respective function blocks will be described later.

The storage unit 120 stores a program for operating the control unit 110 using a semiconductor memory or a storage medium such as a hard disc. Further, for example, the storage unit 120 can also store various kinds of data (such as, for example, content and objects) to be used by the program. Note that while the storage unit 120 is integrated with the display control device 10 in the example illustrated in FIG. 2, the storage unit 120 may be configured separately from the display control device 10.

As described above, the display unit 150 is connected to the display control device 10 in a wireless or wired manner. The display unit 150 includes a first detecting unit 151, and the terminal 170 includes a second detecting unit 171. The first detecting unit 151 has a function of detecting orientation of the display unit 150. The orientation of the display unit 150 detected by the first detecting unit 151 is input to the control unit 110 via the first input unit 131. Meanwhile, the second detecting unit 171 has a function of detecting orientation of the terminal 170. The orientation of the terminal 170 detected by the second detecting unit 171 is input to the control unit 110 via the second detecting unit 171.

The first detecting unit 151 detects the orientation of the display unit 150. For example, the first detecting unit 151 may include a geomagnetic sensor and measure geomagnetic data indicating orientation of geomagnetism in a coordinate system of the display unit 150 using the geomagnetic sensor. The geomagnetic data can be utilized for, for example, a direction the display unit 150 faces (orientation in a horizontal direction). Further, the first detecting unit 151 may include an acceleration sensor and measure acceleration applied to the display unit 150 using the acceleration sensor. The acceleration can be utilized for, for example, tilt of the display unit 150 (orientation in a vertical direction).

Further, the first detecting unit 151 may further include a gyro sensor and measure an angular velocity of rotation of the display unit 150 using the gyro sensor and detect the angular velocity as a change rate of the orientation of the display unit 150. The change rate of the orientation of the display unit 150 detected in this manner can be utilized for detection of the orientation of the display unit 150 at the first detecting unit 151. Note that while the first detecting unit 151 is integrated with the display unit 150 in the example illustrated in FIG. 2, the first detecting unit 151 may be configured separately from the display unit 150.

The second detecting unit 171 detects the orientation of the terminal 170. For example, the second detecting unit 171 may include a geomagnetic sensor and measure geomagnetic data indicating orientation of geomagnetism in a coordinate system of the terminal 170 using the geomagnetic sensor. The geomagnetic data can be utilized for, for example, a direction the terminal 170 faces (orientation in a horizontal direction). Further, the second detecting unit 171 may include an acceleration sensor, measure acceleration applied to the terminal 170 using the acceleration sensor and detect change of the orientation of the terminal 170 based on the acceleration. The acceleration can be utilized for, for example, tilt of the terminal 170 (orientation in a vertical direction).

Further, the second detecting unit 171 may further include a gyro sensor, measure an angular velocity of rotation of the terminal 170 using the gyro sensor and detect the angular velocity as a change rate of the orientation of the terminal 170. The change rate of the orientation of the terminal 170 detected in this manner can be utilized for detection of the orientation of the terminal 170 at the second detecting unit 171. Note that while the second detecting unit 171 is integrated with the terminal 170 in the example illustrated in FIG. 2, the second detecting unit 171 may be configured separately from the second detecting unit 171.

The configuration example of the functions of the information processing system 1 according to the embodiment of the present disclosure has been described above.

[1-3. Details of Functions of Information Processing System]

Figure 3:
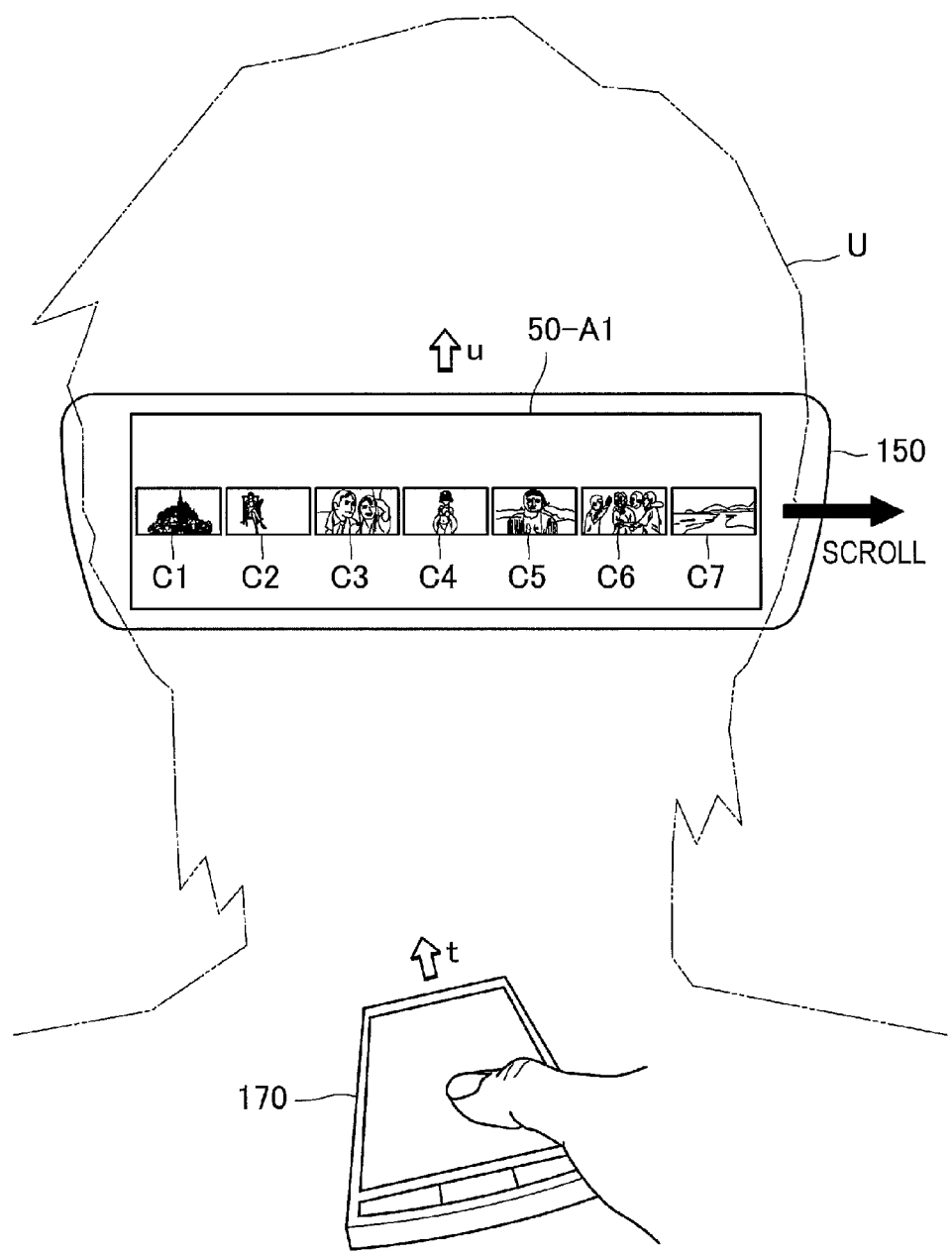
FIG. 3 is a diagram illustrating an example where content is scrolled in a first example.

Details of functions of the information processing system 1 according to the embodiment of the present disclosure will be described next. First, a first example will be described with reference to FIG. 3 to FIG. 9. FIG. 3 is a diagram illustrating an example of a case where content is scrolled in the first example. As illustrated in FIG. 3, the user wears the display unit 150 on his head and has the terminal 170 with part of his body (for example, a hand). The display control unit 113 displays the screen 50-A1 at the display unit 150. The screen 50-A1 includes content C1 to C7.

The first acquiring unit 111 acquires the orientation u of the display unit detected by the first detecting unit 151. Further, the second acquiring unit 112 acquires the orientation t of the terminal detected by the second detecting unit 171. Here, the display control unit 113 scrolls content according to the orientation u of the display unit. By this means, it is possible to allow the user to easily scroll the content. Further, the user can scroll the content intuitively.

The orientation t of the terminal can be also used by the display control unit 113. In such a case, for example, the display control unit 113 may perform predetermined control according to the orientation t of the terminal. By this means, because it becomes possible to also use the orientation t of the terminal, for example, even if it is difficult to adjust the orientation u of the display unit, it is possible to perform input by utilizing the orientation t of the terminal. Possible examples of the case where it is difficult to adjust the orientation u of the display unit include a case where it is difficult for the user to maintain the orientation of his head to fixed orientation for a long period of time. For example, the display control unit 113 may scroll the content according to a relationship between the orientation u of the display unit and the orientation t of the terminal.

While the relationship between the orientation u of the display unit and the orientation t of the terminal may be any relationship, as one example, the display control unit 113 may scroll the content according to the orientation t of the terminal which is relative to the orientation u of the display unit. More specifically, the display control unit 113 may scroll the content in opposite orientation to the orientation t of the terminal which is relative to the orientation u of the display unit. FIG. 3 illustrates a case where the orientation t of the terminal which is relative to the orientation u of the display unit is leftward when viewed from the user. At this time, the display control unit 113 may scroll the content to the right, which is opposite to the left, in order for the user to easily view a left side of the screen 50-A1.

Scroll speed of the content is not particularly limited, and, for example, the display control unit 113 may control the scroll speed of the content according to an angular difference between the orientation u of the display unit and the orientation t of the terminal. More specifically, the display control unit 113 may increase the scroll speed of the content for a larger angular difference between the orientation u of the display unit and the orientation t of the terminal. This control allows the user to adjust the scroll speed of the content intuitively.

Note that while a case has been described in the above description where the orientation t of the terminal acquired by the second acquiring unit 112 is used by the display control unit 113, it is also possible to use some kind of reference orientation in place of the orientation t of the terminal. For example, the display control unit 113 may scroll the content according to the orientation u of the display unit which is relative to the reference orientation. More specifically, the display control unit 113 may scroll the content in opposite orientation to the orientation u of the display unit which is relative to the reference orientation. The reference orientation may be set in advance by the user or may be set by the control unit 110.

Figure 4:
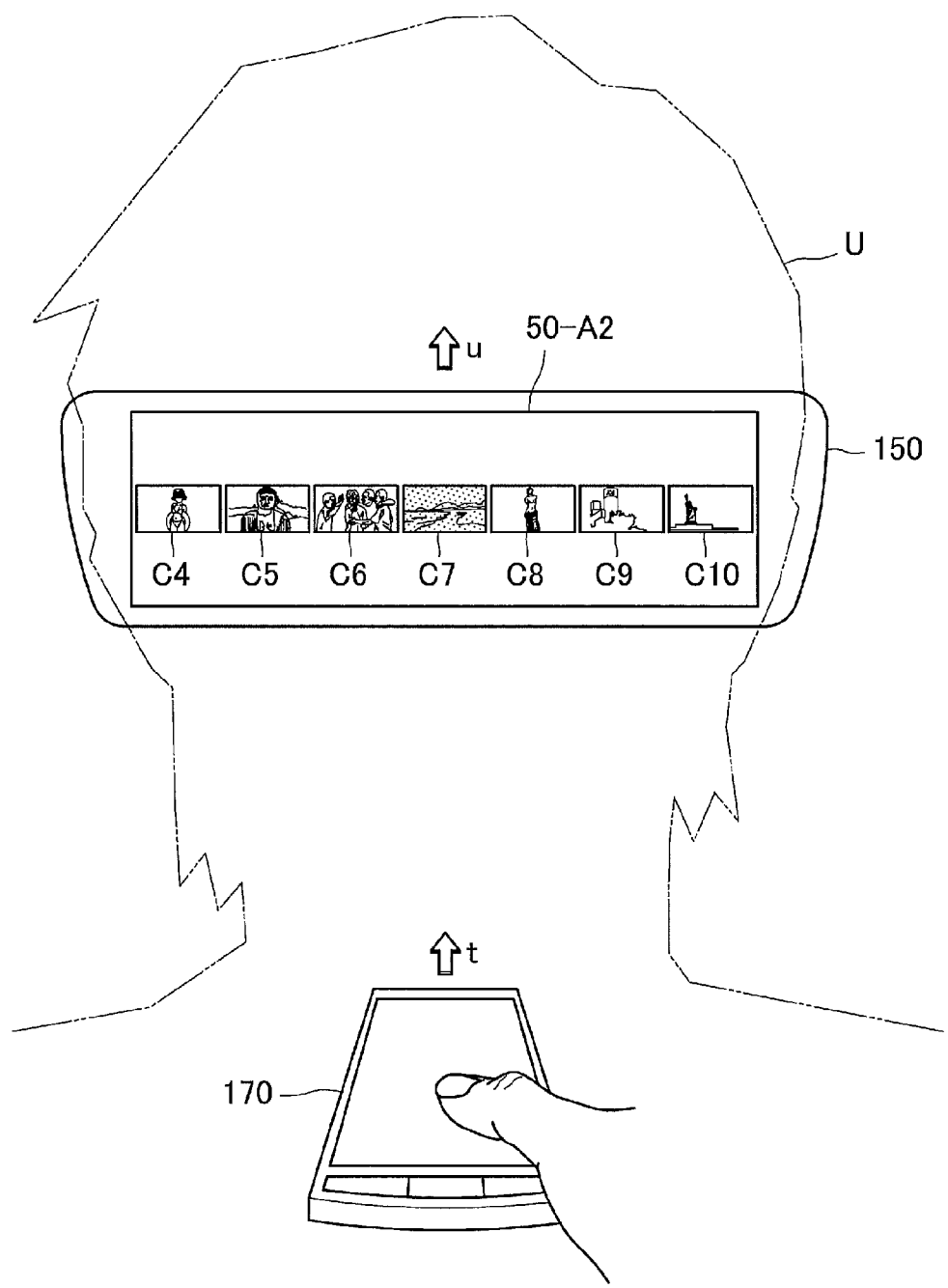
FIG. 4 is a diagram illustrating an example where scrolling is stopped in the first example.

Here, the display control unit 113 only has to stop scrolling of the content when the orientation u of the display unit matches the orientation t of the terminal or the orientation falls within a predetermined range. FIG. 4 is a diagram illustrating an example of a case where scrolling is stopped in the first example. Referring to FIG. 4, because the orientation u of the display unit matches the orientation t of the terminal after the content is scrolled, a screen 50-A2 including content C4 to C10 is displayed by the display control unit 113 and scrolling of the content is stopped in a state where the screen 50-A2 is displayed.

Further, while focus is placed on content C7 in the center among content C4 to C10 in the example illustrated in FIG. 4, content on which focus is placed is not particularly limited. In this state, for example, when the user performs predetermined operation to the terminal 170, the display control unit 113 may select content on which focus is placed. While the predetermined operation is not particularly limited, the predetermined operation may include operation of the user tapping the terminal 170.

Figure 5:
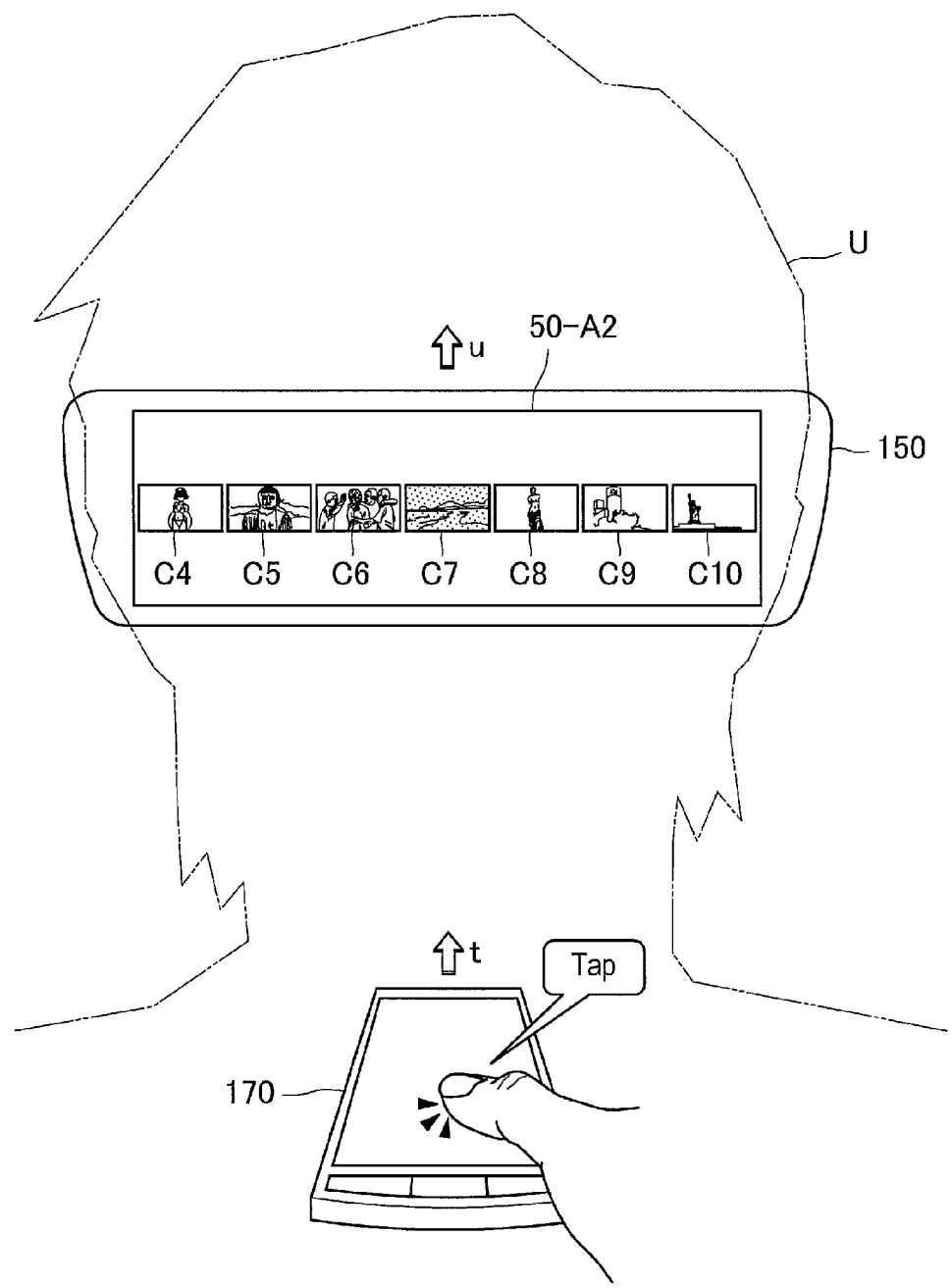
FIG. 5 is a diagram illustrating an example of operation for selecting content in the first example.

FIG. 5 is a diagram illustrating an example of operation for selecting the content C7 in the first example. Referring to FIG. 5, when the user taps the terminal 170 in a state where focus is placed on the content C7, the display control unit 113 selects the content C7 on which focus is placed. The display control unit 113 perform any control on the content C7 after the content C7 is selected. For example, as a result of the content C7 being selected, a selection result screen including enlarged content C7 may be displayed.

Figure 6:
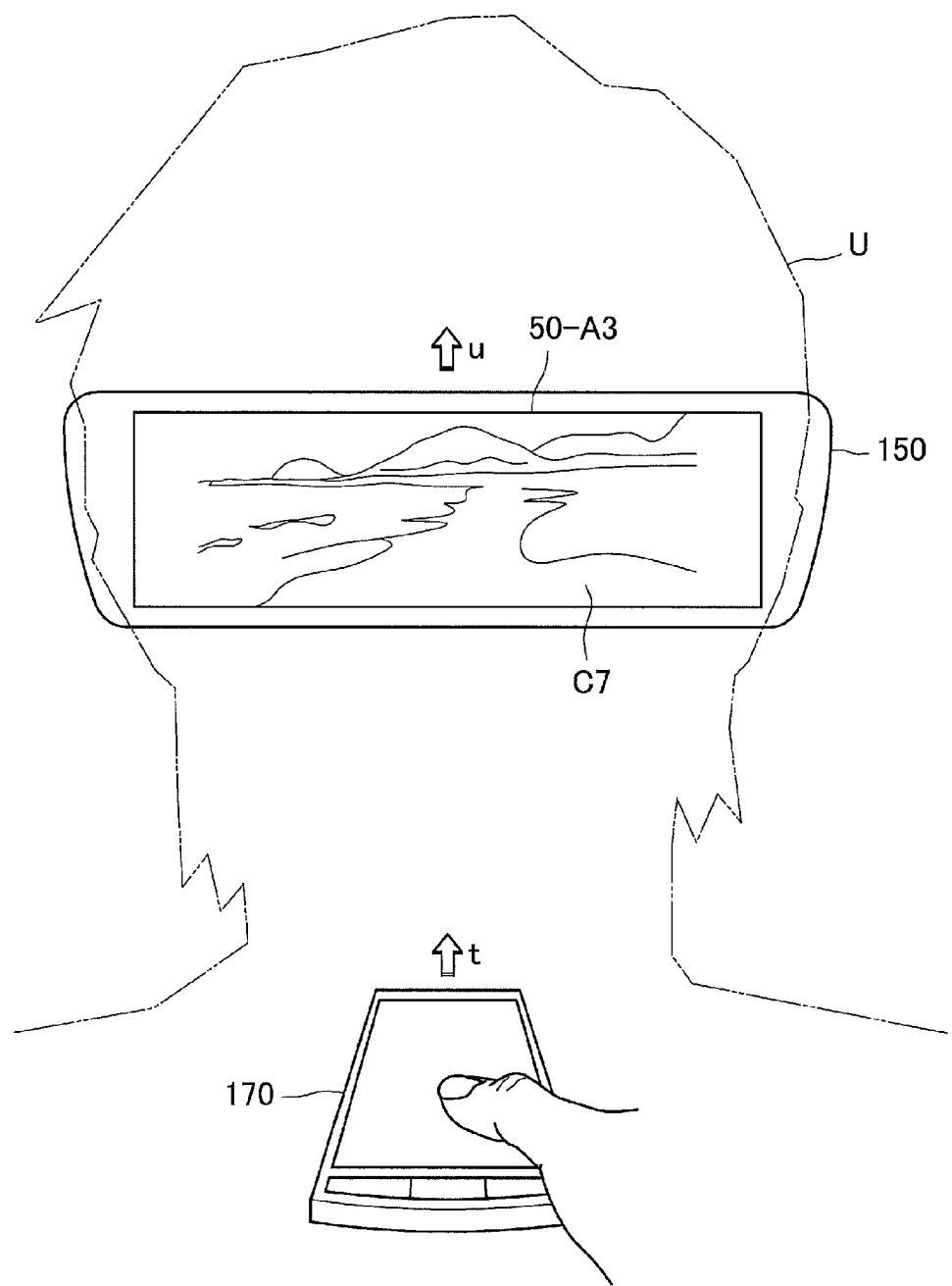
FIG. 6 is a diagram illustrating an example where a selection result screen is displayed as a result of content being selected in the first example.

FIG. 6 is a diagram illustrating an example of a case where a selection result screen 50-A3 is displayed as a result of the content C7 being selected in the first example. Referring to FIG. 6, the display control unit 113 displays the selection result screen 50-A3 including the enlarged content C7 at the display unit 150. Further, for example, when the user performs predetermined operation on the terminal 170 in a state where the selection result screen 50-A3 is displayed, the display control unit 113 may be able to return the screen to the previous screen. While the predetermined operation is not particularly limited, the predetermined operation may include operation of the user holding down a button on the terminal 170 for a long period of time.

Figure 7:
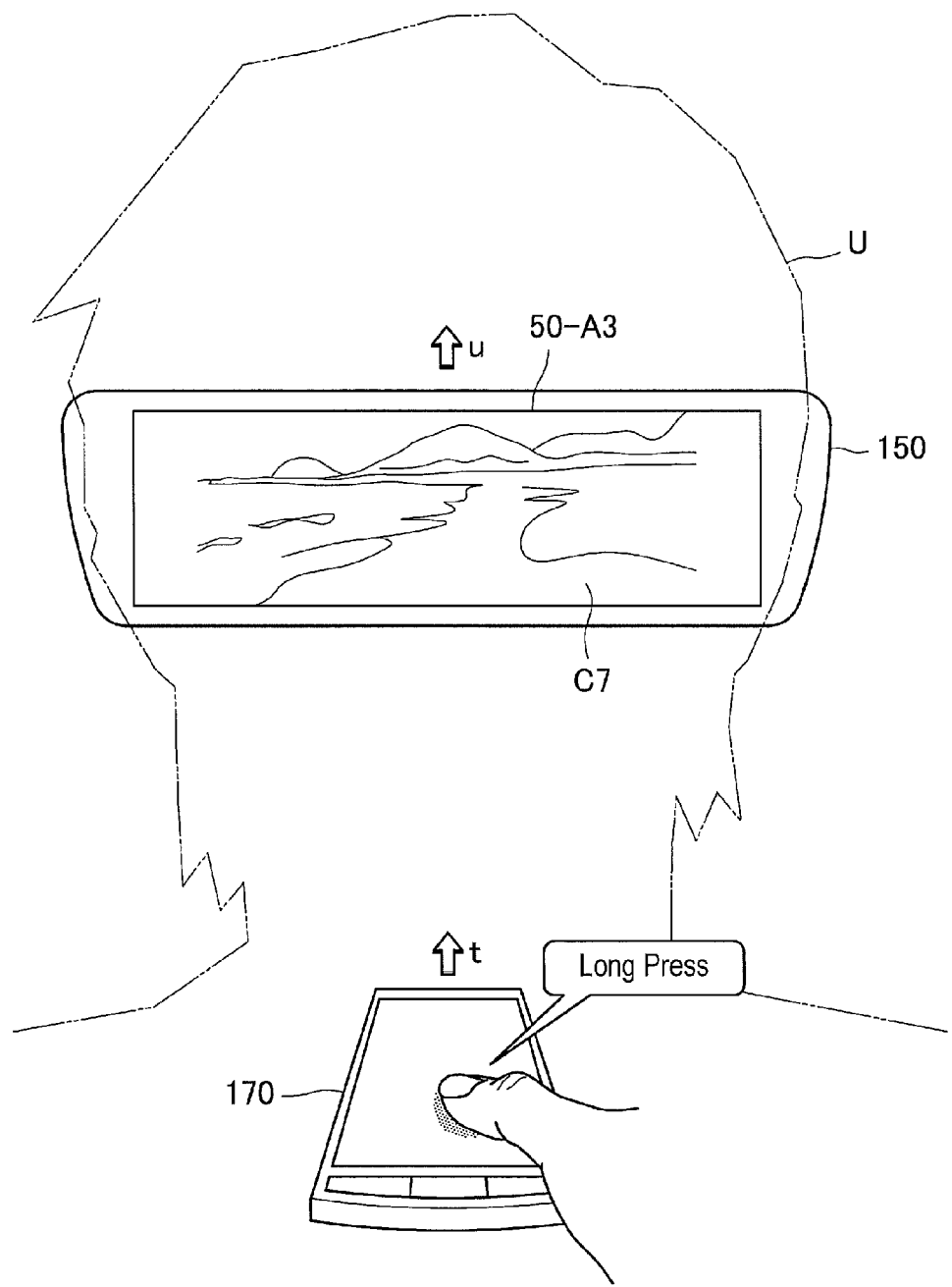
FIG. 7 is a diagram illustrating an example of operation for returning display from the selection result screen to the previous screen in the first example.
Figure 8:
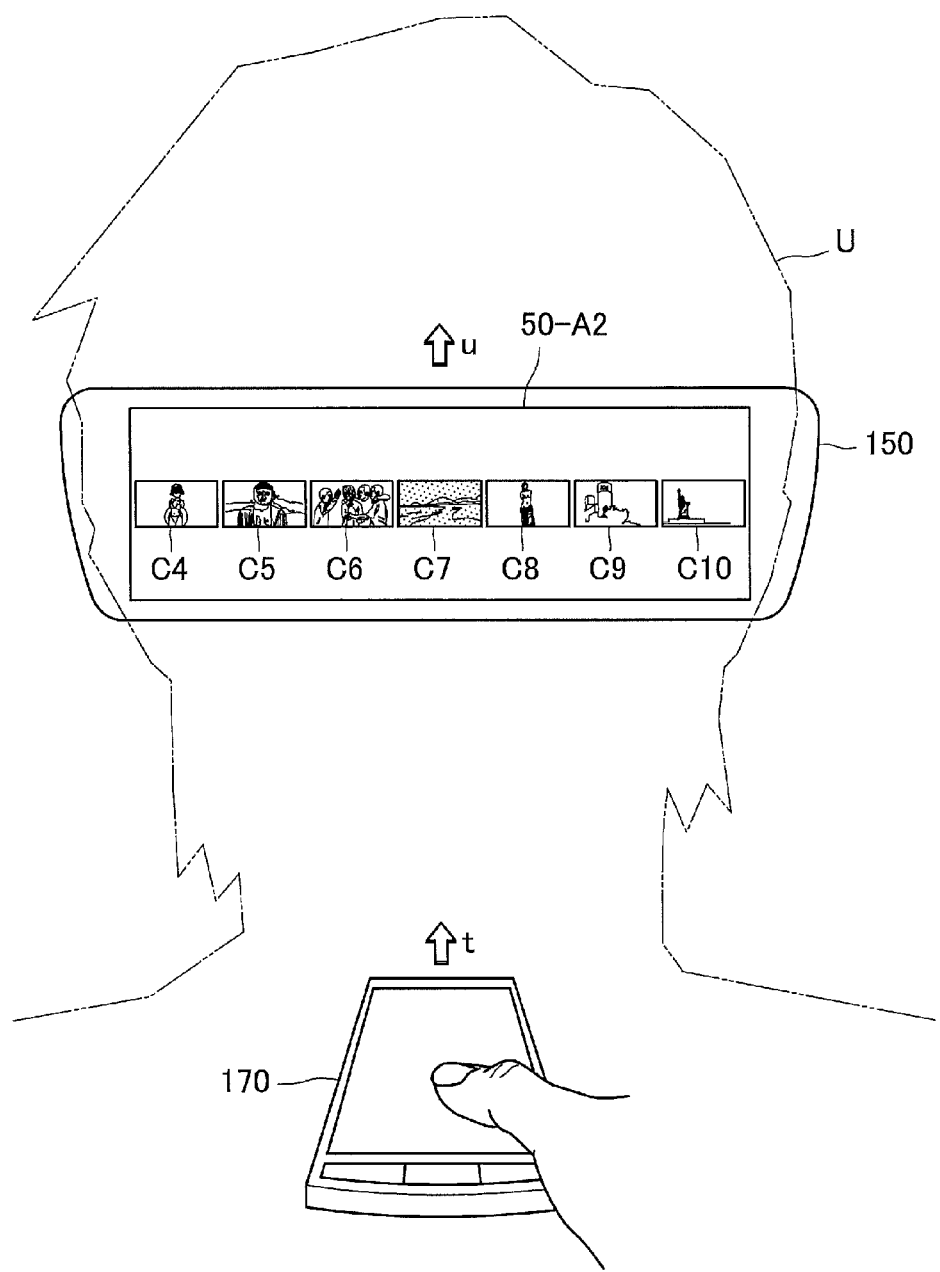
FIG. 8 is a diagram illustrating an example where display is returned from the selection result screen to the previous screen in the first example.

FIG. 7 is a diagram illustrating an example of operation for returning display from the selection result screen 50-A3 to the previous screen 50-A2 in the first example. Further, FIG. 8 is a diagram illustrating an example of a case where display is returned from the selection result screen 50-A3 to the previous screen 50-A2 in the first example. Referring to FIG. 7 and FIG. 8, when the user holds down a button on the terminal 170 for a long period of time in a state where the enlarged content C7 is displayed, the display control unit 113 displays the previous screen 50-A2 at the display unit 150.

Figure 9:
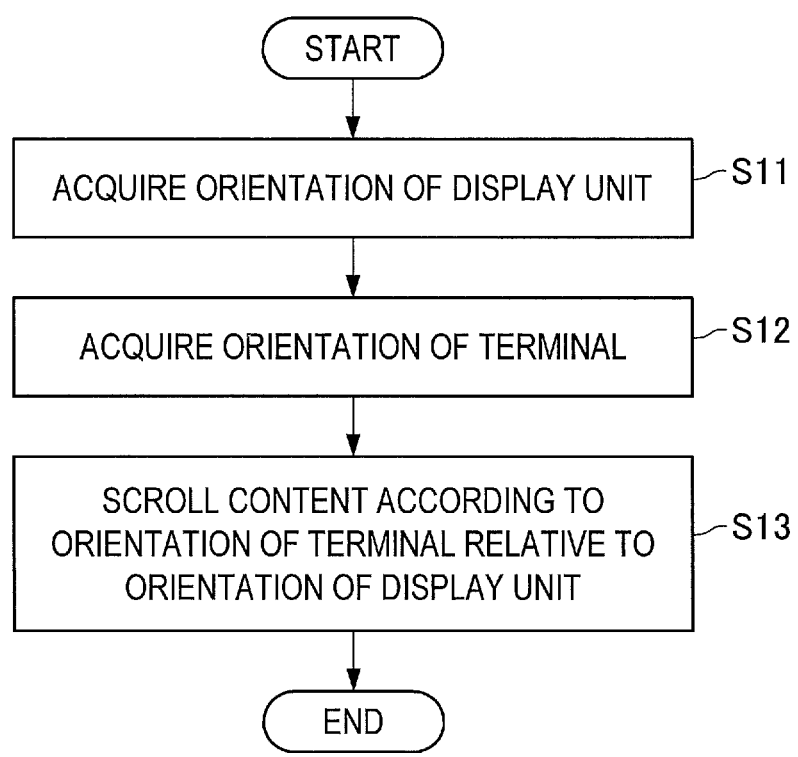
FIG. 9 is a flowchart illustrating flow of operation of a display control device in the first example.

FIG. 9 is a flowchart illustrating flow of operation of the display control device 10 in the first example.

Note that the example illustrated in FIG. 9 is merely one example of the flow of the operation of the display control device 10 in the first example. Therefore, the flow of the operation of the display control device 10 in the first example is not limited to the example illustrated in FIG. 9.

As illustrated in FIG. 9, when the orientation u of the display unit is detected by the first detecting unit 151, the orientation u of the display unit is input to the control unit 110 via the first input unit 131, and the orientation u of the display unit is acquired by the first acquiring unit 111 (S11). Subsequently, when the orientation t of the terminal is detected by the second detecting unit 171, the orientation t of the terminal is input to the control unit 110 via the second input unit 132, and the orientation u of the display unit is acquired by the second acquiring unit 112 (S12).

The display control unit 113 scrolls the content according to the orientation t of the terminal which is relative to the orientation u of the display unit (S13). Note that after the operation of S13 is finished, the control unit 110 may return to the operation of S11 again or may finish the operation. The first example has been described above.

Figure 10:
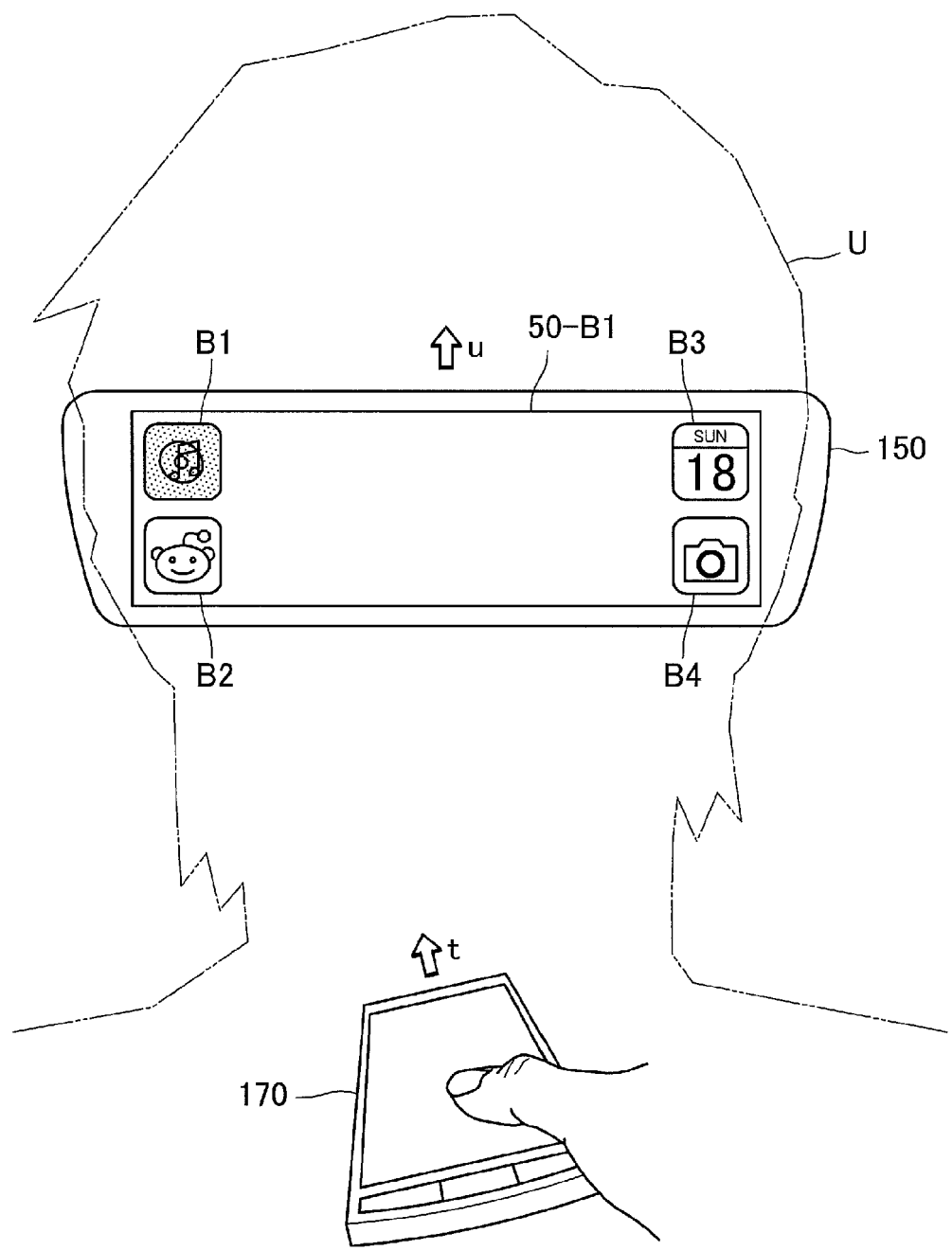
FIG. 10 is a diagram illustrating an example where focus is moved in a second example.

A second example will be described next with reference to FIG. 10 to FIG. 14. FIG. 10 is a diagram illustrating an example of a case where focus is moved in the second example. As illustrated in FIG. 10, the user wears the display unit 150 on his head and has the terminal 170 with part of his body (for example, a hand). The display control unit 113 displays a screen 50-B1 at the display unit 150. The screen 50-B1 includes objects B1 to B4.

The first acquiring unit 111 acquires the orientation u of the display unit detected by the first detecting unit 151. Further, the second acquiring unit 112 acquires the orientation t of the terminal detected by the second detecting unit 171. Here, the display control unit 113 moves focus according to the orientation t of the terminal. By this means, the user can easily move the focus.

The orientation u of the display unit can be also used by the display control unit 113. In such a case, for example, the display control unit 113 may perform predetermined control according to the orientation u of the display unit. By this means, because it becomes possible to also use the orientation t of the terminal, variations of the operation which can be input by the user can be increased. For example, the display control unit 113 may move the focus according to a relationship between the orientation u of the display unit and the orientation t of the terminal.

While the relationship between the orientation u of the display unit and the orientation t of the terminal may be any relationship, as one example, the display control unit 113 may move the focus according to the orientation t of the terminal which is relative to the orientation u of the display unit. More specifically, the display control unit 113 may move the focus according to the orientation t of the terminal which is relative to the orientation u of the display unit. FIG. 10 illustrates a case where the orientation t of the terminal which is relative to the orientation u of the display unit is leftward when viewed from the user. At this time, the display control unit 113 may move the focus to a position of an object B1 in an upper left region of the screen 50-B1.

Note that while a case has been described above where the orientation u of the display unit acquired by the first acquiring unit 111 is used by the display control unit 113, it is also possible to use some kind of reference orientation in place of the orientation u of the display unit. For example, the display control unit 113 may move the focus according to the orientation t of the terminal which is relative to the reference orientation. More specifically, the display control unit 113 may move the focus according to the orientation t of the terminal which is relative to the reference orientation. The reference orientation may be set in advance by the user or may be set by the control unit 110.

When, for example, the user performs predetermined operation on the terminal 170 in a state where focus is placed on the position of the object B1, the display control unit 113 may be able to select the object on which focus is placed. The predetermined operation is not particularly limited, and may include operation of the user tapping the terminal 170.

Figure 11:
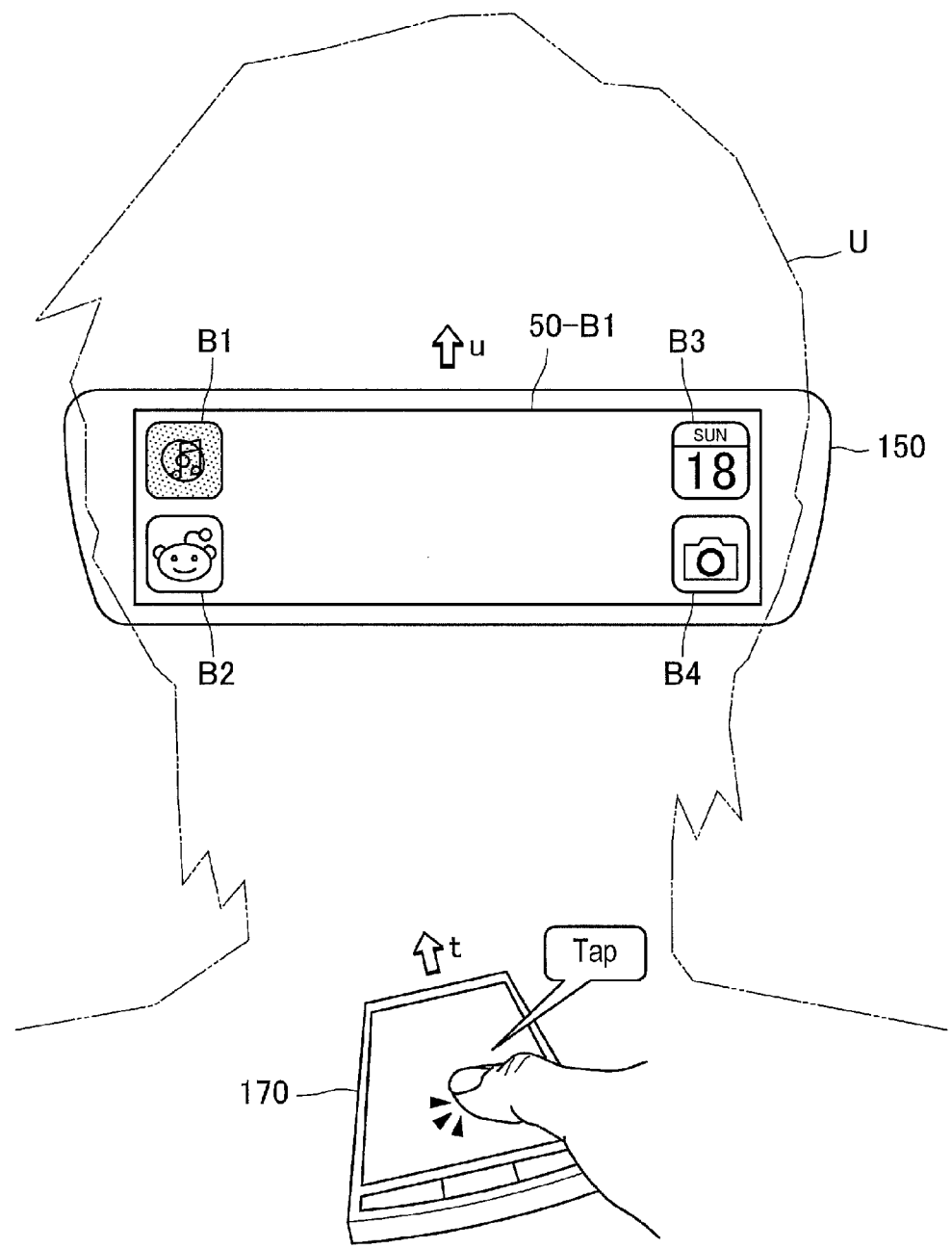
FIG. 11 is a diagram illustrating an example where object is selected in the second example.

FIG. 11 is a diagram illustrating an example of a case where the object B1 is selected in a second example. Referring to FIG. 11, when the user taps the terminal 170 in a state where focus is placed on the object B1, the display control unit 113 selects the object B1 on which focus is placed. After the object B1 is selected, the display control unit 113 may perform any control on the object B1. For example, as a result of the object B1 being selected, a selection result screen including content corresponding to the object B1 may be displayed.

Figure 12:
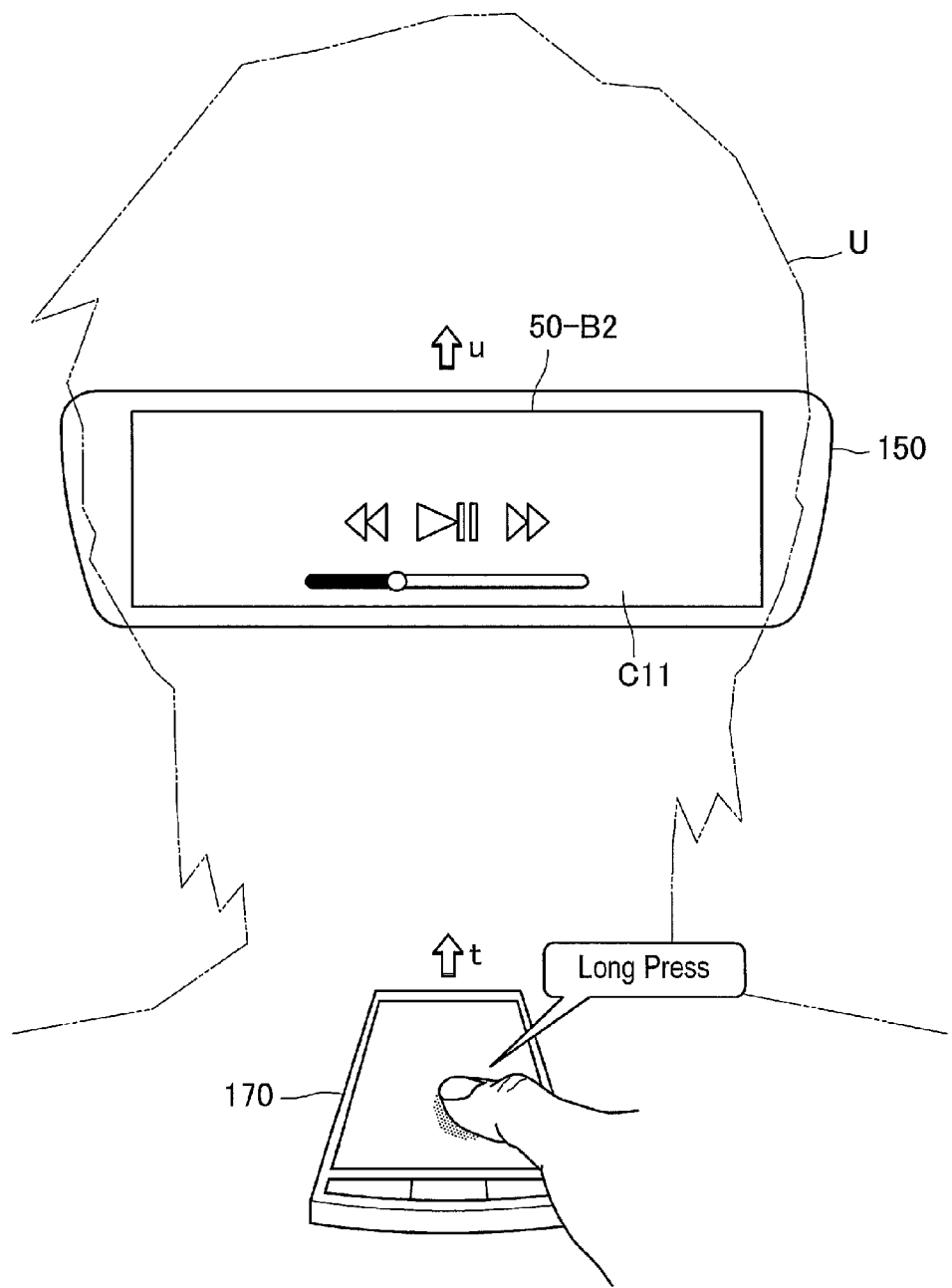
FIG. 12 is a diagram illustrating an example where a selection result screen is displayed as a result of object being selected in the second example.

FIG. 12 is a diagram illustrating an example of a case where a selection result screen 50-B2 is displayed as a result of the object B1 being selected in the second example. Referring to FIG. 12, the display control unit 113 displays the selection result screen 50-B2 including content C11 corresponding to the object B1 at the display unit 150. Further, when, for example, the user performs predetermined operation on the terminal 170 in a state where the selection result screen 50-B2 is displayed, the display control unit 113 may be able to return the screen to the previous screen. The predetermined operation is not particularly limited, and may include operation of the user holding down a button on the terminal 170 for a long period of time.

Figure 13:
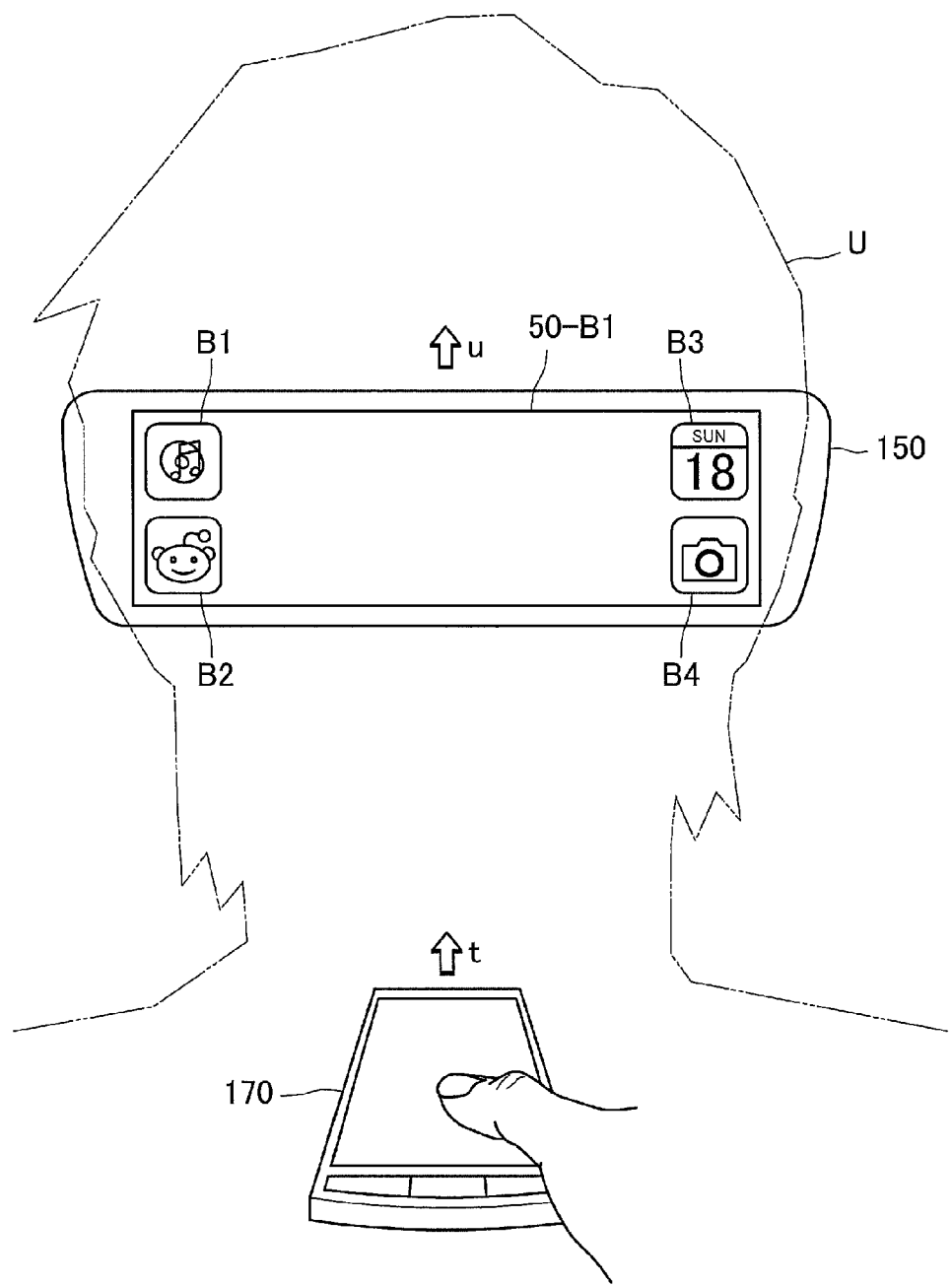
FIG. 13 is a diagram illustrating an example where display is returned from the selection result screen to display of the object in the second example.

FIG. 13 is a diagram illustrating an example of a case where display is returned from the selection result screen 50-B2 to the previous screen 50-B1 in the second example. Referring to FIG. 12 and FIG. 13, when the user holds down a button for a long period of time on the terminal 170 in a state where the content C11 corresponding to the object B1 is displayed, the display control unit 113 displays the previous screen 50-B1.

Figure 14:
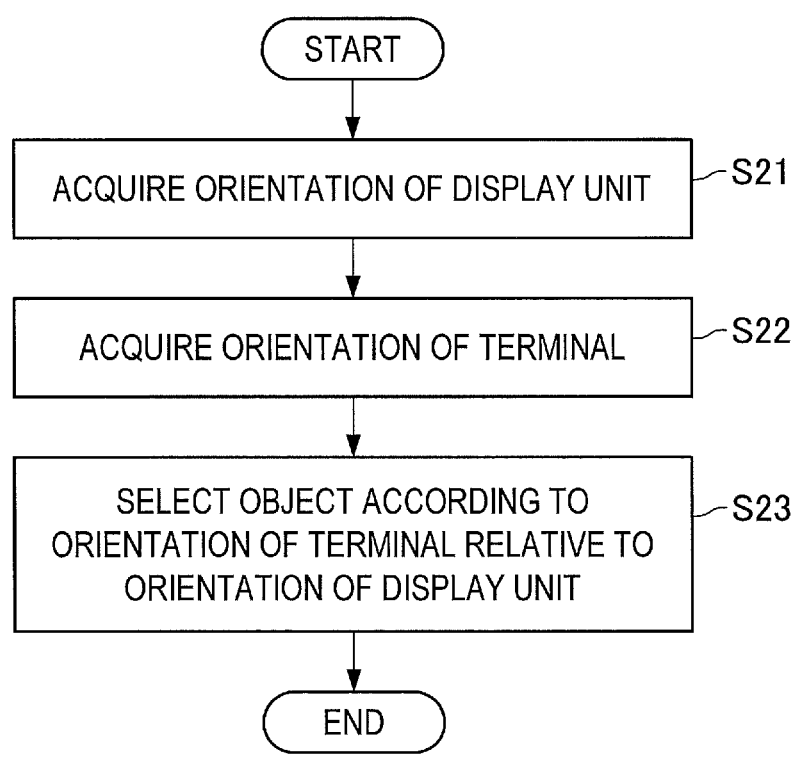
FIG. 14 is a flowchart illustrating flow of operation of a display control device in the second example.

FIG. 14 is a flowchart illustrating flow of operation of the display control device 10 in the second example. Note that the example illustrated in FIG. 14 is merely an example of flow of the operation of the display control device 10 in the second example. Therefore, the flow of the operation of the display control device 10 in the second example is not limited to the example illustrated in FIG. 14.

As illustrated in FIG. 14, when the orientation u of the display unit is detected by the first detecting unit 151, the orientation u of the display unit is input to the control unit 110 via the first input unit 131, and the orientation u of the display unit is acquired by the first acquiring unit 111 (S21). Subsequently, when the orientation t of the terminal is detected by the second detecting unit 171, the orientation t of the terminal is input to the control unit 110 via the second input unit 132, and the orientation u of the display unit is acquired by the second acquiring unit 112 (S22).

The display control unit 113 selects an object according to the orientation t of the terminal which is relative to the orientation u of the display unit (S23). Note that after the operation of S23 is finished, the control unit 110 may return to the operation of S21 again or may finish the operation. The second example has been described above.

Figure 15:
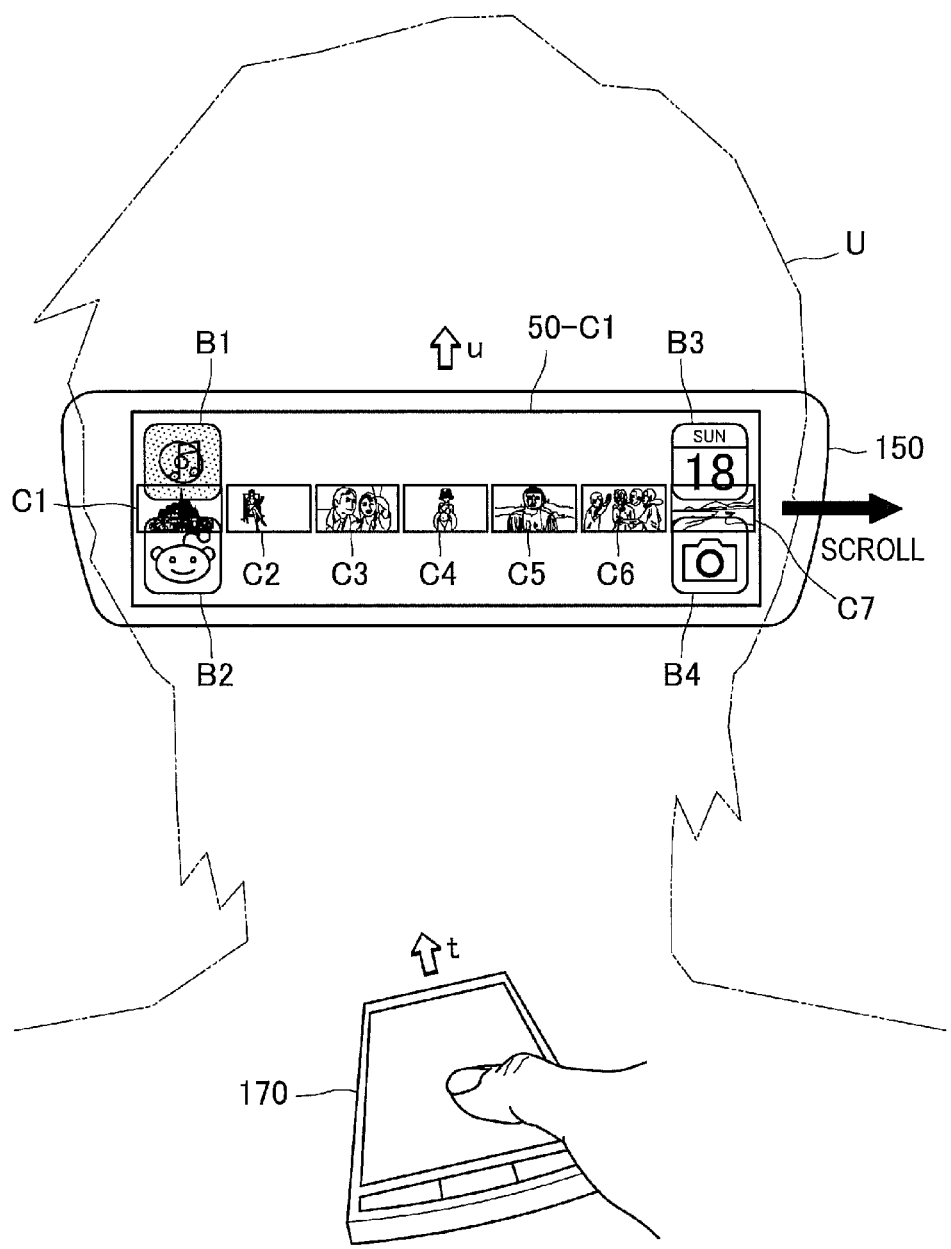
FIG. 15 is a diagram illustrating an example where content is scrolled in a third example.

Subsequently, referring to FIG. 15 and FIG. 16, a third example will be described. FIG. 15 is a diagram illustrating an example of a case where focus is moved in the third example. As illustrated in FIG. 15, the user wears the display unit 150 on his head and has the terminal 160 with part of his body (for example, a hand). The display control unit 113 displays the screen 50-C1 at the display unit 150. The screen 50-C1 includes content C1 to C7 and objects B1 to B4.

The first acquiring unit 111 acquires the orientation u of the display unit detected by the first detecting unit 151. Further, the second acquiring unit 112 acquires the orientation t of the terminal detected by the second detecting unit 171. Here, the display control unit 113 scrolls content according to the orientation u of the display unit. Further, the display control unit 113 selects an object according to the orientation t of the terminal. By this means, it becomes possible to easily scroll content and easily select an object.

For example, the display control unit 113 may scroll the content according to the orientation u of the display unit which is relative to reference orientation. More specifically, the display control unit 113 may scroll the content in opposite orientation to the orientation u of the display unit which is relative to the reference orientation. The reference orientation may be set in advance by the user or may be set by the control unit 110.

In a similar manner, for example, the display control unit 113 may select an object according to the orientation t of the terminal which is relative to reference orientation. More specifically, the display control unit 113 may select an object according to the orientation t which is relative to the reference orientation. The reference orientation may be set in advance by the user or may be set by the control unit 110.

Figure 16:
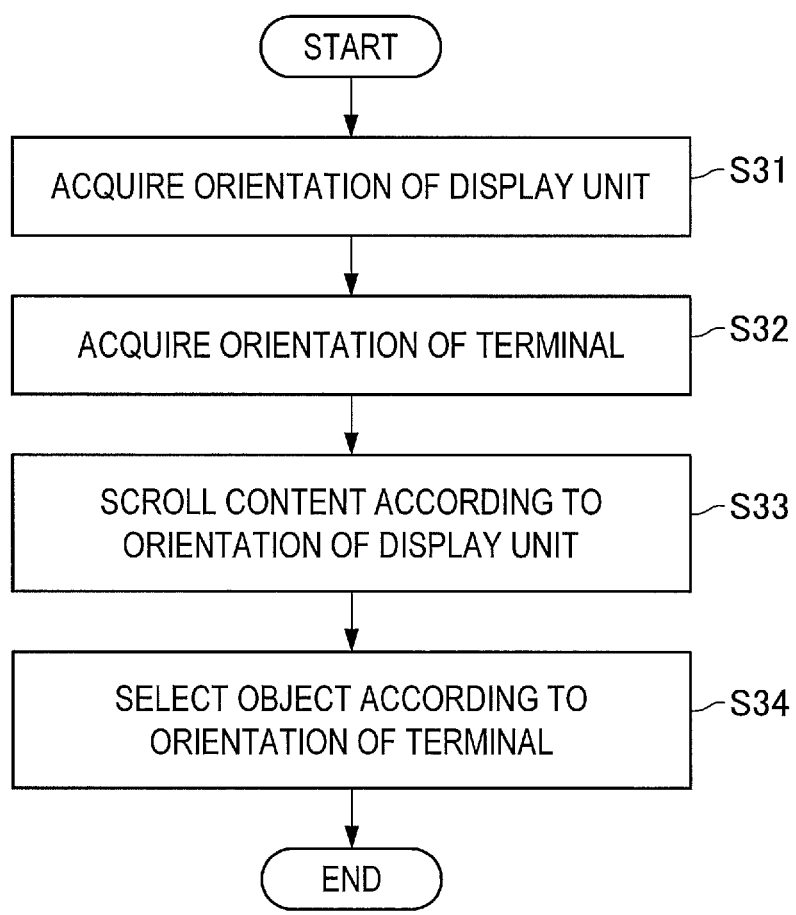
FIG. 16 is a flowchart illustrating flow of operation of a display control device in the third example.

FIG. 16 is a flowchart illustrating flow of operation of the display control device 10 in the third example. Note that the example illustrated in FIG. 16 is merely an example of the flow of the operation of the display control device 10 in the third example. Therefore, the flow of the operation of the display control device 10 in the third example is not limited to the example illustrated in FIG. 16.

As illustrated in FIG. 16, when the orientation u of the display unit is detected by the first detecting unit 151, the orientation u of the display unit is input to the control unit 110 via the first input unit 131, and the orientation u of the display unit is acquired by the first acquiring unit 111 (S31). Subsequently, when the orientation t of the terminal is detected by the second detecting unit 171, the orientation t of the terminal is input to the control unit 110 via the second input unit 132, and the orientation u of the display unit is acquired by the second acquiring unit 112 (S32).

The display control unit 113 scrolls content according to the orientation u of the display unit (S33). Further, the display control unit 113 selects an object according to the orientation t of the terminal (S34). Note that after the operation of S34 is finished, the control unit 110 may return to the operation of S31 again or may finish the operation. The third example has been described above.

In the first example and the third example, a case has been described where the display control unit 113 scrolls the content according to the orientation u of the display unit.

However, it is assumed that the user tries to change the orientation of the display unit 150 for the purpose other than the purpose of scrolling the content. Therefore, the display control unit 113 may determine whether or not to scroll the content based on whether or not the user inputs predetermined operation. While a case will been described in the following description where the predetermined operation is touch operation, the predetermined operation may be any operation.

Figure 17:
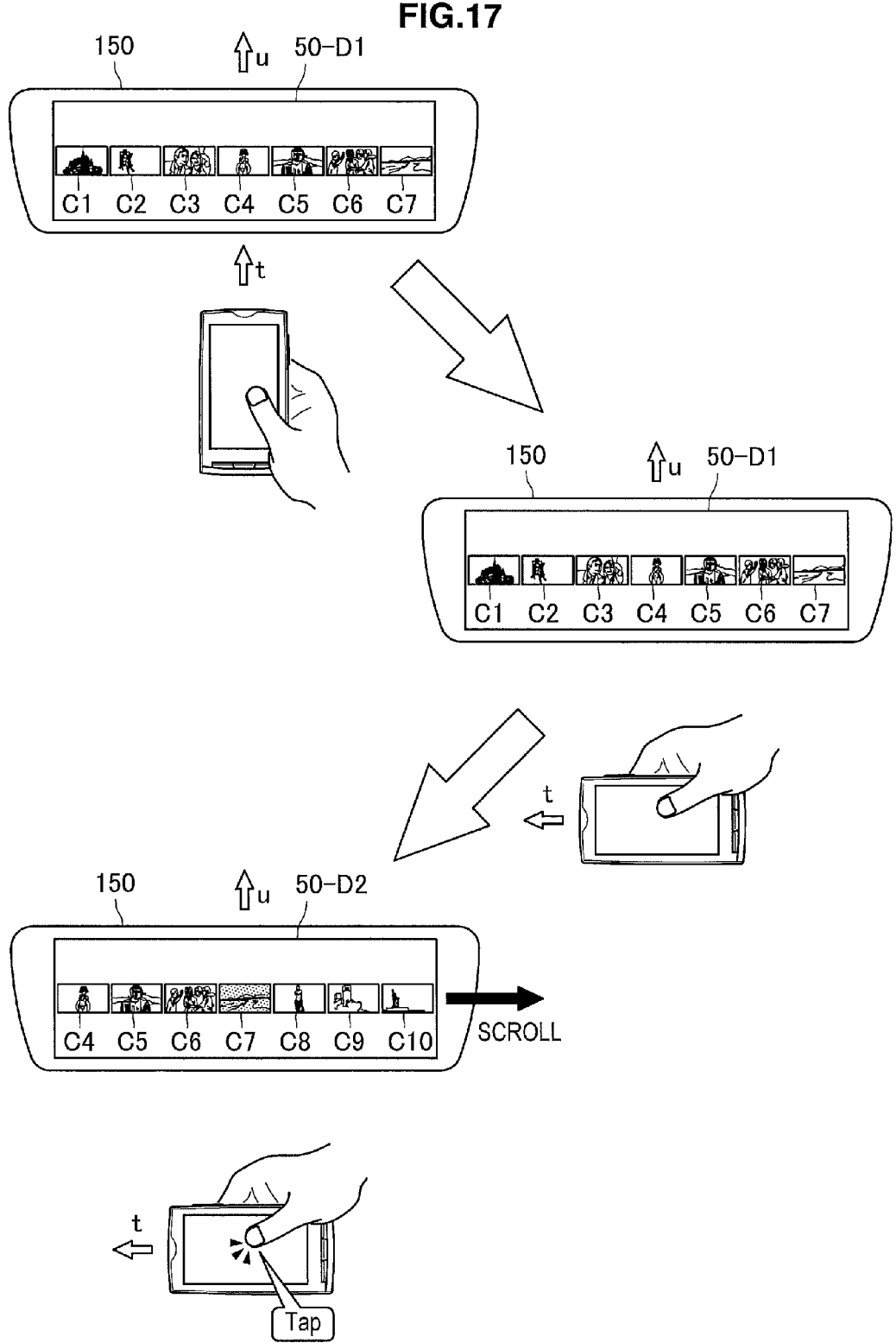
FIG. 17 is a diagram illustrating a modification of the first example and the third example.

FIG. 17 is a diagram illustrating a modification of the first example and the third example. As illustrated in FIG. 17, the user wears the display unit 150 on his head and has the terminal 170 with part of his body (for example, a hand). The display control unit 113 displays a screen 50-D1 at the display unit 150. The screen 50-D1 includes content C1 to C7.

The first acquiring unit 111 acquires the orientation u of the display unit detected by the first detecting unit 151. Further, the second acquiring unit 112 acquires the orientation t of the terminal detected by the second detecting unit 171. Here, as illustrated in the screen 50-D1, the display control unit 113 may determine not to scroll the content while the user does not input touch operation. Meanwhile, as illustrated in a screen 50-D2, the display control unit 113 may determine to scroll the content while the user inputs touch operation.

Note that the operation performed while the user does not input touch operation may be replaced with the operation performed while the user inputs touch operation. That is, the display control unit 113 may determine not to scroll the content while the user inputs touch operation, while the display control unit 113 may determine to scroll the content while the user does not input touch operation.

Further, in the second example and the third example, an example has been described where the display control unit 113 selects an object according to the orientation t of the terminal. However, it is assumed that the user tries to change the orientation of the terminal 170 for the purpose other than purpose of selecting an object. Therefore, the display control unit 113 may determine whether or not to select an object based on whether or not the user inputs predetermined operation.

For example, the display control unit 113 may determine not to select an object while the user does not input touch operation. Meanwhile, the display control unit 113 may determine to select an object while the user inputs touch operation.

Note that the operation performed while the user inputs touch operation may be replaced with the operation performed while the user does not input touch operation. That is, the display control unit 113 may determine not to select an object while the user inputs touch operation, while the display control unit 113 may determine to select an object while the user does not input touch operation.

Details of the functions of the information processing system 1 according to the embodiment of the present disclosure has been described above.

[1-4. Hardware Configuration Example]

Figure 18:
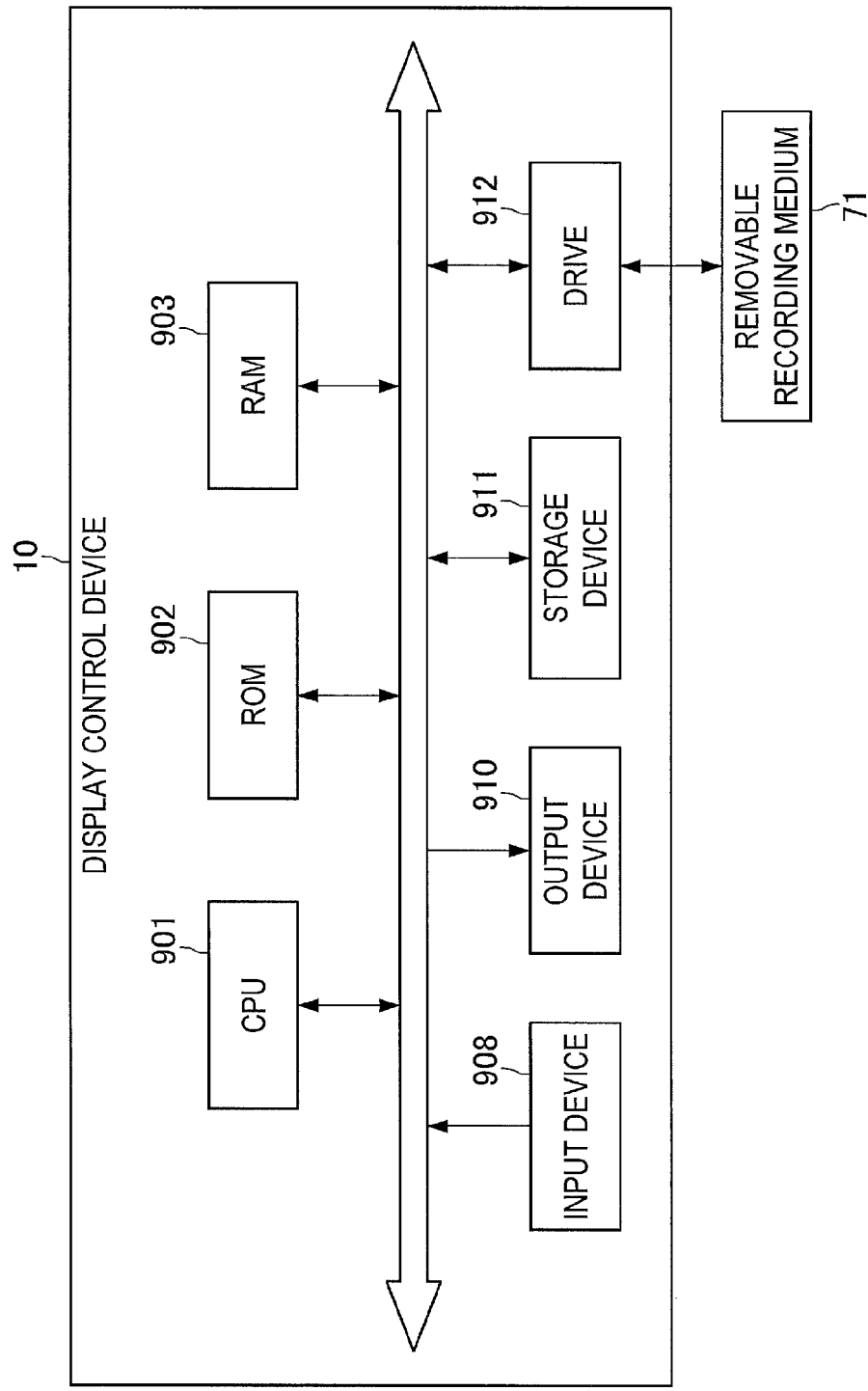
FIG. 18 is a diagram illustrating a hardware configuration example of a display control device according to the embodiment of the present disclosure.

Subsequently, a hardware configuration example of the display control device 10 according to the embodiment of the present disclosure will be described. FIG. 18 is a diagram illustrating a hardware configuration example of the display control device 10 according to the embodiment of the present disclosure. However, the hardware configuration example illustrated in FIG. 18 is merely an example of a hardware configuration of the display control device 10.

Therefore, the hardware configuration of the display control device 10 is not limited to the example illustrated in FIG. 18.

As illustrated in FIG. 18, the display control device 10 includes a central processing unit (CPU) 901, a read-only memory (ROM) 902, a random-access memory (RAM) 903, an input device 908, an output device 910, a storage device 911, and a drive 912.

The CPU 901, which functions as a calculation processing device and a control device, controls the overall operation of the display control device 10 based on various programs. Further, the CPU 901 may be a microprocessor. The ROM 902 stores programs, calculation parameters and the like used by the CPU 901. The RAM 903 temporarily stores the programs to be used during execution by the CPU 901, and parameters that appropriately change during that execution. These units are connected to each other by a host bus, which is configured from a CPU bus or the like.

The input device 908 receives input of the orientation of the display unit 150 detected by the first detecting unit 151 and the orientation of the terminal 170 detected by the second detecting unit 171. The orientation of the display unit 150 and the orientation of the terminal 170 received at the input device 908 is output to the CPU 901. Further, the input device 908 may receive input of a change amount of the orientation of the display unit 150 detected by the first detecting unit 151 and a change amount of the orientation of the terminal 170 detected by the second detecting unit 171 and output the change amounts to the CPU 901.

The output device 910 provides output data to the display unit 150. For example, the output device 910 provides display data to the display unit 150 under the control of the CPU 901. If the display unit 150 is configured from an audio output device, the output device 910 provides audio data to the display unit 150 under the control of the CPU 901.

The storage device 911 is a device used to store data that is configured as an example of the storage unit 120 in the display control device 10. The storage device 911 may also include a storage medium, a recording device that records data on the storage medium, a reading device that reads data from the storage medium, a deletion device that deletes data recorded on the storage medium and the like. This storage device 911 stores programs executed by the CPU 901 and various kinds of data.

The drive 912 is a storage medium reader/writer, which may be built-in or externally attached to the display control device 10. The drive 912 reads information recorded on a removable storage medium 71, such as a mounted magnetic disk, optical disc, magneto-optical disk, or semiconductor memory, and outputs the read information to the RAM 903. Further, the drive 912 can also write information to the removable storage medium 71.

A hardware configuration example of the display control device 10 according to an embodiment of the present disclosure was described above.

<<2. Conclusion>>

As described above, according to the embodiment of the present disclosure, there is provided a display control device 10 which includes a first acquiring unit 111 configured to acquire orientation of a display unit 150 detected by the first detecting unit 151, and a display control unit 113 configured to display content at the display unit 150, wherein the display control unit 113 scrolls the content according to the orientation of the display unit 150. According to this configuration, it is possible to provide a technique for allowing a user to easily scroll the content.

Note that while details of the preferred embodiment of the present disclosure has been described with reference to the appended drawings, the technical scope of the present disclosure is not limited to these examples. It should be understood by those skilled in the art that various modifications, combinations, sub-combinations and alterations may occur depending on design requirements and other factors insofar as they are within the scope of the appended claims or the equivalents thereof.

Further, a program for realizing the same functions as the units included in the above-described display control device 10 can also recreate the hardware, such as the CPU, the ROM, and the RAM, that is included in the computer. In addition, a computer-readable recording medium having this program recorded thereon can also be provided.

Additionally, the present technology may also be configured as below.

(1)

A display control device including:

a first acquiring unit configured to acquire orientation of a display unit detected by a first detecting unit; and a display control unit configured to display content at the display unit, wherein the display control unit scrolls the content according to the orientation of the display unit.

(2)

The display control device according to (1), further including:

a second acquiring unit configured to acquire orientation of a terminal detected by a second detecting unit, wherein the display control unit performs predetermined control according to the orientation of the terminal.

(3)

The display control device according to (2), wherein the display control unit scrolls the content according to a relationship between the orientation of the display unit and the orientation of the terminal.

(4)

The display control device according to (3), wherein the display control unit scrolls the content according to the orientation of the terminal which is relative to the orientation of the display unit.

(5)

The display control device according to (4), wherein the display control unit controls scroll speed of the content according to an angular difference between the orientation of the display unit and the orientation of the terminal.

(6)

The display control device according to any one of (2) to (5), wherein the display control unit scrolls the content according to the orientation of the display unit and selects an object based on the orientation of the terminal.

(7)

The display control device according to any one of (1) to (6), wherein the display control unit determines whether or not to scroll the content based on whether or not a user inputs predetermined operation.

(8)

A display control method including:

acquiring orientation of a display unit detected by a first detecting unit;

displaying content at the display unit; and scrolling the content according to the orientation of the display unit.

(9)

A computer-readable recording medium having a program recorded therein, the program causing a computer to function as a display control device including:

a first acquiring unit configured to acquire orientation of a display unit detected by a first detecting unit; and a display control unit configured to display content at the display unit, wherein the display control unit scrolls the content according to the orientation of the display unit.

REFERENCE SIGNS LIST 1 information processing system
10 display control device
110 control unit
111 first acquiring unit
112 second acquiring unit
113 display control unit
120 storage unit
131 first input unit
132 second input unit
150 display unit
151 first detecting unit
170 terminal
171 second detecting unit
B1 to B4 object
C1 to C11 content

The invention claimed is:

1. A head-mounted display device, comprising:
a screen configured to display content independently from a remote control terminal;
at least one first sensor configured to detect a first orientation of the head-mounted display device; and
a processor configured to:
acquire the first orientation of the head-mounted display device from the at least one first sensor;
acquire a second orientation of the remote control terminal from at least one second sensor, wherein the at least one second sensor detects the second orientation of the remote control terminal; and
control the screen to scroll the content in a first direction based on the first orientation of the head-mounted display device and the second orientation of the remote control terminal in a second direction,
wherein the first direction is opposite to the second direction.

2. The head-mounted display device according to claim 1, wherein the second orientation of the remote control terminal is relative to the first orientation of the head-mounted display device.

3. The head-mounted display device according to claim 1, wherein the processor is further configured to control a scroll speed of the content based on an angular difference between the first orientation of the head-mounted display device and the second orientation of the remote control terminal.

4. The head-mounted display device according to claim 1, wherein the processor is further configured to control the screen to scroll the content based on the first orientation of the head-mounted display device and select an object based on the second orientation of the remote control terminal.

5. The head-mounted display device according to claim 1, wherein the processor is further configured to control the screen to scroll the content based on user input.

6. The head-mounted display device according to claim 1, wherein the processor is further configured to control the screen to scroll the content based on an angular difference between the first orientation of the head-mounted display device and the second orientation of the remote control terminal.

7. The head-mounted display device according to claim 1, wherein the at least one second sensor is a gyro sensor.

8. The head-mounted display device according to claim 1, wherein the remote control terminal is one of a cellular phone, a personal digital assistant, a personal computer, a mobile music reproduction device, a mobile image processing device, or a mobile game equipment.

9. A display control method, comprising:
displaying, by a head-mounted display device on a screen, content independently from a remote control terminal;
acquiring, by a processor, a first orientation of the head-mounted display device, wherein the first orientation is detected by at least one first sensor;
acquiring, by the processor, a second orientation of the remote control terminal from at least one second sensor, wherein the at least one second sensor detects the second orientation of the remote control terminal; and
controlling, by the processor, the screen to scroll content in a first direction based on the first orientation of the head-mounted display device and the second orientation of the remote control terminal in a second direction,
wherein the first direction is opposite to the second direction.

10. A non-transitory computer-readable medium having stored thereon, computer-executable instructions that when executed by a processor in a head-mounted display device, cause the processor to execute operations, the operations comprising:
displaying, by the head-mounted display device on a screen, content independently from a remote control terminal;
acquiring, by the processor, a first orientation of the head-mounted display device, wherein the first orientation is detected by at least one first sensor;
acquiring , by the processor, a second orientation of the remote control terminal from at least one second sensor, wherein the at least one second sensor detects the second orientation of the remote control terminal; and
controlling, by the processor, the screen to scroll the content in a first direction based on the first orientation of the head-mounted display device and the second orientation of the remote control terminal in a second direction,
wherein the first direction is opposite to the second direction.

* * * * *